(12) United States Patent
Vigouroux et al.

(10) Patent No.: US 8,340,176 B2
(45) Date of Patent: Dec. 25, 2012

(54) DEVICE AND METHOD FOR GROUPING OF IMAGES AND SPANNING TREE FOR VIDEO COMPRESSION

(75) Inventors: Jean-Ronan Vigouroux, Rennes (FR); Nour-Eddine Tazine, Noyal sur Vilaine (FR)

(73) Assignee: Thomson Licensing (FR)

( * ) Notice: Subject to any disclaimer, the term of this patent is extended or adjusted under 35 U.S.C. 154(b) by 1499 days.

(21) Appl. No.: 11/152,611

(22) Filed: Jun. 14, 2005

(65) Prior Publication Data

US 2006/0002612 A1 Jan. 5, 2006

(30) Foreign Application Priority Data

Jul. 1, 2004 (FR) ...................................... 04 51395

(51) Int. Cl.
*H04N 7/12* (2006.01)
(52) U.S. Cl. .................................................. 375/240.08
(58) Field of Classification Search ............... 375/240.08
See application file for complete search history.

(56) References Cited

U.S. PATENT DOCUMENTS

| | | | | |
|---|---|---|---|---|
| 5,995,668 | A * | 11/1999 | Corset et al. .................. | 382/233 |
| 6,148,107 | A * | 11/2000 | Ducloux et al. ............... | 382/236 |
| 6,249,616 | B1 * | 6/2001 | Hashimoto ................... | 382/284 |
| 6,907,069 | B2 | 6/2005 | Matsuzaki et al. | |
| 7,852,414 | B2 | 12/2010 | Kijak et al. | |
| 7,889,792 | B2 * | 2/2011 | Dumitras et al. ........ | 375/240.13 |
| 2001/0055337 | A1 | 12/2001 | Matsuzaki et al. | |
| 2002/0029232 | A1 * | 3/2002 | Bobrow et al. ............... | 707/517 |
| 2005/0171962 | A1 * | 8/2005 | Martin et al. ................. | 707/100 |
| 2008/0193016 | A1 * | 8/2008 | Lim et al. ..................... | 382/190 |

FOREIGN PATENT DOCUMENTS

| | | |
|---|---|---|
| FR | 2 846 502 A1 | 4/2004 |
| JP | 1023408 | 1/1998 |
| JP | 200210259 | 1/2002 |
| JP | 2002152740 | 5/2002 |
| WO | W02004040472 | 5/2004 |

OTHER PUBLICATIONS

Stephen R. Tate, 'Band Ordering in Lossless Compression of Muttispectral Images'. XP-002320048, IEEE Transactions on Computers, vol. 46, No. 4, Apr. 1997, pp. 477u-483.
Matthew Cooper and Jonathan Foote, "Scene Boundary Detection Via Video Sell-Similarity Analysis". pp. 378-381.
Search Report.

* cited by examiner

*Primary Examiner* — Jay Au Patel
*Assistant Examiner* — Richard Torrente
(74) *Attorney, Agent, or Firm* — Jack Schwartz and Associates, PLLC

(57) ABSTRACT

A device and a process for compressing video documents. The process includes decomposition of the video document into shots, extraction of images representative of the said shots, measurement of the distances between the said representative images, grouping of the images whose distance is less than a predetermined threshold into a group of images, calculation of the relative cost of coding of each image with respect to the other images of the group of images. The process further includes calculation of a minimum spanning tree for each group of images minimizing the cost of coding of each group of images and coding of each group of images by browsing the images in the order given by the said spanning tree.

5 Claims, 2 Drawing Sheets

DEVICE AND METHOD FOR GROUPING OF IMAGES AND SPANNING TREE FOR VIDEO COMPRESSION

This application claims the benefit, under 35 U.S.C. §119 of French Patent Application 0451395, filed Jul. 1, 2004.

The invention relates to a device and a method of compressing video documents.

BACKGROUND OF THE INVENTION

The invention relates more particularly to video compression adapted to archiving.

The compression constraints of a video document are less significant when concerned with archiving the video than when concerned with compressing the video for transmission.

Specifically, a video intended to be compressed, transmitted and decompressed in real time must be compressed by taking the images one after another, in a chronological order, as done by coding methods such as MPEG-2 for example.

When the images are intended to be recorded on storage media for long term storage, such as hard disks for example, it is possible to compress them in any order so as to optimize the quantity of information stored and thus to minimize the storage resources required. The compression constraints are therefore not the same as in the case of real time coding/decoding.

The invention therefore relates to the ordering of the images of a video document prior to coding so as to increase the degree of compression. Actually, several methods of data compression use groupings into clusters. However, once the clusters have been finalized, the coding is performed directly on the images in their chronological order.

The present invention makes it possible to circumvent this chronological order and to code the images while obtaining an optimized degree of compression.

BRIEF SUMMARY OF THE INVENTION

To this end, the invention relates to a process for compressing video documents comprising the steps of:
  decomposition of the video document into shots,
  extraction of images representative of the said shots,
  measurement of the distances between the said representative images,
  grouping of the images whose distance is less than a predetermined threshold into a group of images,
  calculation of the relative cost of coding of each image with respect to the other images of the group of images.
According to the invention, the process comprises the steps of
  calculation of a minimum spanning tree for each group of images minimizing the cost of coding of each group of images
  coding of each group of images by browsing the images in the order given by the said spanning tree.

The minimum spanning tree can make it possible to modify the order of coding of the images and thus to improve the degree of compression. This is particularly suitable, but not exclusively reserved, for compression intended for archiving where the coding time is not significant and where the order of coding is not significant.

According to a preferred embodiment, the first coded image of the spanning tree is coded in intra mode.

According to a preferred embodiment, the images other than the first image are coded in predictive mode with respect to the previous image in the optimum spanning tree.

According to a preferred embodiment, several images spaced apart in the spanning tree are coded in intra mode.

The invention will be better understood and illustrated by means of wholly nonlimiting, advantageous modes of embodiment and implementation, with reference to the appended figures in which:

DETAILED DESCRIPTION OF THE INVENTION

A video document consists of a succession of images, themselves often being able to be grouped into shots, the shots corresponding to picture breaks.

Figure 1:
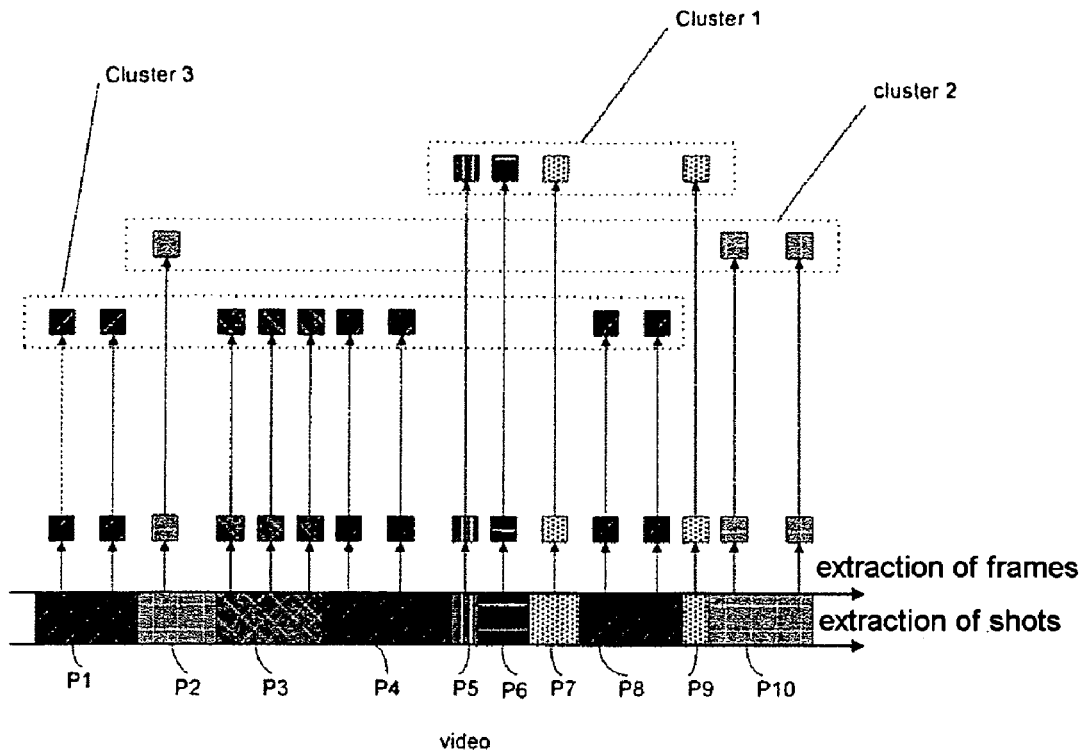
FIG. 1 represents the decomposition of the video into groups of representative images.

FIG. 1 represents a decomposition of a video document into shots P1, P2, P3, . . . , P10. FIG. 1 will be described in parallel with FIG. 2 illustrating the steps of the process making it possible to obtain the splitting of the video document illustrated in FIG. 1.

Figure 2:
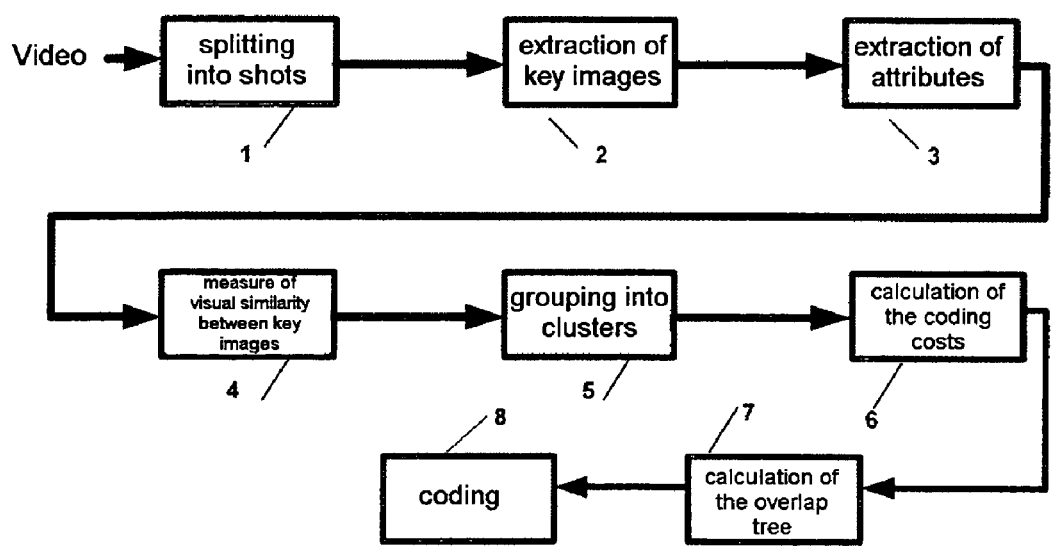
FIG. 2 represents the steps of the process according to the invention.

Various methods of decomposing a video into shots exist, illustrated by step 1 of FIG. 2. Such a method is in particular described in French Patent Application 0213978 filed on 28 Oct. 2002 in the name of the company Thomson Licensing SA. This patent application also describes the extraction of key images (step 2 of FIG. 2) for each shot. One or more key images may be extracted from each shot, this being dependent on the amount of motion of the shot, a shot exhibiting considerable motion being able to be characterized by more than one key image.

Thereafter, the key images are grouped together as a function of their similarity (step 4 FIG. 2).

The similarity is calculated by a measure of distance between images. The measure of distance between images is based on the distance between attributes F.

F is representative of a characteristic of the image chosen, by way of nonlimiting illustration, from among texture, colour. By way of alternative, the dominant coefficients of the wavelet transform may also be taken as attribute.

Various methods of calculating attributes exist (step 3 FIG. 2) and are well known to the person skilled in the art.

The distance D calculated may be a distance of Euclidian type by way of illustration.

When the distance D is less than a predetermined threshold $\epsilon$, which may for example be fixed as a function of the type of video document, the images are grouped together into groups or "clusters", step 5 of FIG. 2. These groups of images then exhibit significant visual similarity.

When several key images are extracted from one and the same shot, and when during the step of grouping into clusters they do not feature in the same cluster, then the clusters to which they belong are merged.

The number of clusters obtained depends on the predetermined threshold $\epsilon$ of measurement of similarity and on the method used for the grouping into clusters.

Each cluster comprises all the images of a certain number of shots.

Thereafter, for each pair of images in each cluster, a cost of coding is calculated.

Each image is selected one by one and the coding cost (step 6, FIG. 2) relating to each image is evaluated with respect to the others.

Thereafter, on the basis of these coding costs, a minimum spanning tree is calculated for each cluster (step 7, FIG. 2). This minimum spanning tree makes it possible to find a path for browsing the whole set of images of a cluster which minimizes the coding costs.

Among the algorithms for calculating a minimum spanning tree, the Kruskal algorithm is used.

In other embodiments, the Prim algorithm may also be used.

Figure 3:
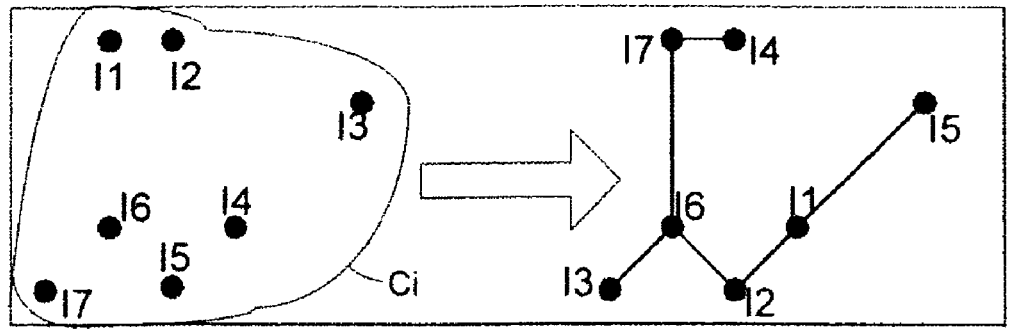
FIG. 3 represents a minimum spanning tree.

An example of such a spanning tree is given in FIG. 3 in which the points represent the images of the cluster.

The cluster Ci comprises seven images numbered I1 to I7.

The images I1 to I7 of one and the same shot within a cluster are consecutive.

The Kruskal algorithm applied to the cluster I1 to I7 gives the spanning tree given in the right-hand part of FIG. 3.

This spanning tree gives the order in which the images must be coded to obtain a minimum coding cost, that is to say a coding cost which allows maximum compression of the video sequence.

When the spanning tree is calculated for each cluster, the images are coded in an order compatible with the spanning tree (step 8, FIG. 2). The choice of the origin image is arbitrary; the most advantageous choice is to take the image having the shortest intra coding. Once the origin image has been chosen, the remaining images are ordered in the order of descent in the tree.

According to this example, image I4 is the first image which will be coded. This image is therefore coded according to an intra mode of coding, that is to say spatial only.

The subsequent images are coded according to a predictive mode with respect to the previous image in the tree. Image I7 is coded with respect to image I7, image I6 is coded with respect to image I3 as well as image I2. Image I1 is coded with respect to image I2 and image I5 is coded with respect to image I1.

In other examples, it is possible for several images to be coded in intra mode. This is so in particular in the case where the cluster comprises a significant number of images. In this case, certain images are chosen, spaced regularly apart in the spanning tree, to be coded in intra mode.

Several schemes for predictive coding may be envisaged. In particular, in the embodiment proposed, the images are coded according to a coding scheme complying with the MPEG-2 or MPEG-4 standard.

Once coded, the images are archived in a storage medium such as a hard disk for example, as well as a description of the structure of clusters and of tree making it possible to reconstitute the global video.

Each image is identified by a time label making it possible to order the images and to reconstitute the video stream during decoding.

The invention is for example especially suited to programmes in which a shot returns regularly. This is especially true in the case of televised magazines or newspapers where the images regularly include shots of the journalists who present the transmission.

Figure 4:
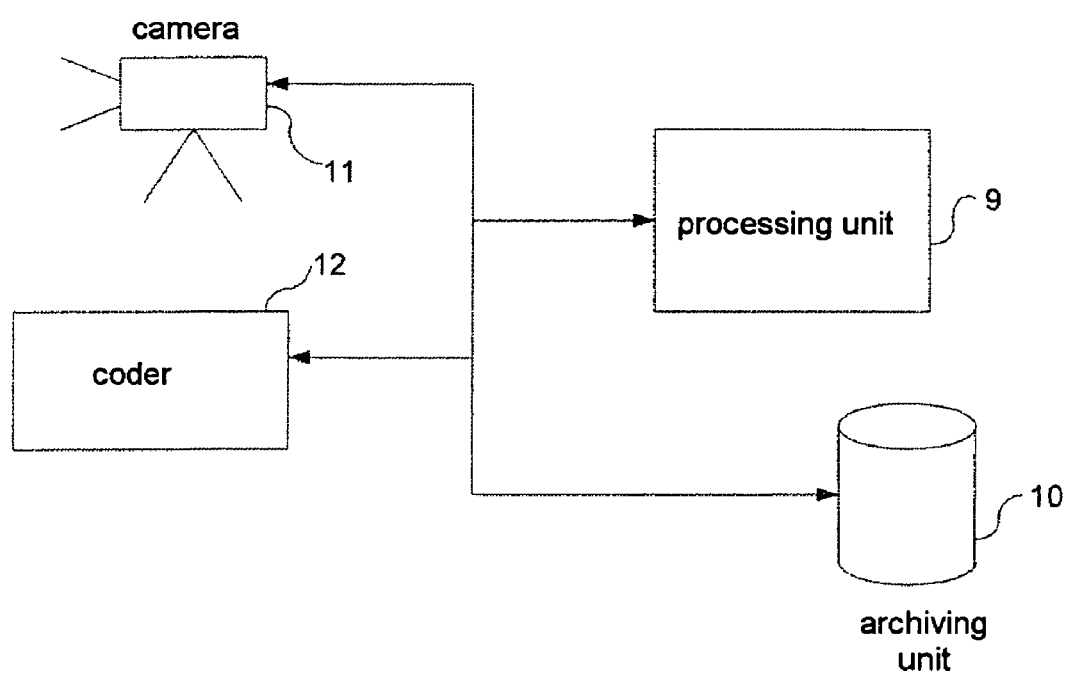
FIG. 4 represents a device according to the invention.

FIG. 4 represents a system in which the invention is implemented.

The system comprises a camera 11. The camera captures an event and the video information is transmitted to a processing unit 9.

The processing unit 9 is suitable for
performing the decomposition of the video document into shots,
extracting representative images of the said shots,
measuring distances between the said representative images,
grouping together images whose distance is less than a predetermined threshold into a group of images,
calculating the relative cost of coding of each image with respect to the other images of the group of images,
calculating a minimum spanning tree for each group of images minimizing the cost of coding of each group of images.

Once this has been done, the image ordering information is transmitted to the coding device 12. The coding device 12 is suitable for coding the video images before transmitting them to the archiving unit 10, which may be a hard disk, a DVD, etc.

What is claimed is:

1. Method for compressing video using a coding device comprising the steps of:
    decomposition of a sequence of images of the video into shots comprising a plurality of images,
    for each shot, extraction among the plurality of images of each shot, of images representative of the shots,
    measurement of the distances between the representative images,
    grouping, across shots, of the images whose distance is less than a predetermined threshold into a group of images,
    calculation of the relative cost of coding of each image with respect to the other images of the group of images,
    calculation of a minimum spanning tree for each group of images minimizing the cost of coding of each group of images,
    coding of each group of images by browsing the images in the order given by the minimum spanning tree.

2. Process according to claim 1, wherein the first coded image of the minimum spanning tree is coded in intra mode.

3. Process according to claim 1, wherein the images other than the first image are coded in predictive mode with respect to the previous image in the minimum spanning tree.

4. Process according to claim 1, wherein several images spaced apart in the minimum spanning tree are coded in intra mode.

5. Device for compressing video comprising:
    a processing unit that:
        decomposes a sequence of images of a video into shots comprising a plurality of images,
        for each shot, extracts among the plurality of images of each shot, of images representative of the shots,
        measures distances between the representative images,
        groups, across shots, the images whose distance is less than a predetermined threshold into a group of images,
        calculates a relative cost of coding of each image with respect to the other images of the group of images, and
        calculates a minimum spanning tree for each group of images minimizing the cost of coding of each group of images; and
    a coding device that:
        codes each group of images by browsing the images in the order given by the minimum spanning tree.

* * * * *